United States Patent
Odate (10) Patent No.: US 10,022,629 B2
(45) Date of Patent: Jul. 17, 2018

(54) INFORMATION STORAGE MEDIUM AND GAME SYSTEM

(71) Applicant: BANDAI NAMCO Entertainment Inc., Shinagawa-ku, Tokyo (JP)

(72) Inventor: Ryuji Odate, Hiratsuka (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 353 days.

(21) Appl. No.: 14/809,504

(22) Filed: Jul. 27, 2015

(65) Prior Publication Data
US 2016/0030847 A1    Feb. 4, 2016

(30) Foreign Application Priority Data
Jul. 31, 2014    (JP) .................................. 2014-156342

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2018.01) |
| *A63F 13/58* | (2014.01) |
| *A63F 13/30* | (2014.01) |
| *A63F 13/833* | (2014.01) |

(52) U.S. Cl.
CPC .............. *A63F 13/58* (2014.09); *A63F 13/30* (2014.09); *A63F 13/833* (2014.09)

(58) Field of Classification Search
USPC .................... 463/9, 22, 24, 25, 31, 39, 42
See application file for complete search history.

(56) References Cited

U.S. PATENT DOCUMENTS

| | | | |
|---|---|---|---|
| 6,439,998 B1* | 8/2002 | Itou ..................... | A63F 13/005 463/23 |
| 2008/0026804 A1* | 1/2008 | Baray .................... | A63F 13/12 463/9 |
| 2008/0096664 A1* | 4/2008 | Baray .................... | A63F 13/12 463/42 |
| 2008/0102911 A1* | 5/2008 | Campbell ......... | G06F 17/30867 463/9 |
| 2012/0064969 A1 | 3/2012 | Uchibori | |
| 2015/0235076 A1* | 8/2015 | Aimonen ........... | G06K 9/00342 348/157 |

FOREIGN PATENT DOCUMENTS

JP         2012-061060 A     3/2012

* cited by examiner

*Primary Examiner* — Adetokunbo O Torimiro
(74) *Attorney, Agent, or Firm* — Posz Law Group, PLC (57) ABSTRACT

A game system includes a character setting section that sets a plurality of characters selected by a player from among a plurality of characters possessed by the player to be battle characters, a game processing section that executes a battle between the characters that have been set to be the battle characters and an enemy character that appears in a stage selected by the player, and an information presentation section that, when a number of times that the player failed to clear the stage has reached a predetermined number, extracts a plurality of characters recommended to be the battle characters from among the characters possessed by the player when the number of times that the player failed to clear the stage has reached a predetermined number, determines whether or not the player can clear the stage when the extracted characters are set to be the battle characters, and presents information that corresponds to the determination result to the player.

14 Claims, 9 Drawing Sheets

| IDENTIFICATION INFORMATION | ATTACK CAPABILITY | RECOVERY CAPABILITY | HIT POINTS | ATTRIBUTE | LEVEL |
|---|---|---|---|---|---|
| 001 | 662 | 653 | 801 | FIRE | 15 |
| 002 | 455 | 582 | 292 | WATER | 10 |
| 003 | 372 | 575 | 230 | TREE | 8 |

INFORMATION STORAGE MEDIUM AND GAME SYSTEM

Japanese Patent Application No. 2014-156342 filed on Jul. 31, 2014, is hereby incorporated by reference in its entirety.

BACKGROUND OF THE INVENTION

The present invention relates to an information storage medium and a game system.

A game that allows the player to form a deck that consists of a plurality of cards (characters), and battle with an enemy character has been known (see JP-A-2012-61060, for example). Such a battle game may be designed so that, when the player has cleared the current stage by defeating the enemy character, the player can play the next stage in which a stronger enemy character appears (i.e., a stage with a higher difficulty level).

When the player plays a stage with a high difficulty level, the player may be unable to clear the stage over and over again if the deck is not formed by selecting appropriate characters (i.e., characters having a relatively high attack capability or recovery capability). When the player plays a stage with a difficulty level that is disproportionate to the level of the characters possessed by the player, the player may be unable to clear the stage even if the deck is formed by selecting appropriate characters. A known battle game has a problem in that the player who has failed to clear the current stage cannot determine whether the player can (may be able to) clear the current stage if the deck is formed by selecting appropriate characters, or the player cannot clear the current stage even if the deck is formed by selecting appropriate characters.

SUMMARY

Several aspects of the invention may provide an information storage medium and a game system that can provide the player with information for determining the possibility that the player can clear the stage.

According to a first aspect of the invention, there is provided a non-transitory computer-readable information storage medium storing a program that causes a computer to function as:

a character setting section that sets a plurality of characters selected by a player from among a plurality of characters possessed by the player to be battle characters;

a game processing section that executes a battle between the plurality of characters that have been set to be the battle characters and an enemy character that appears in a stage selected by the player, and determines whether or not the player has cleared the stage based on battle results; and an information presentation section that, when a number of times that the player failed to clear the stage has reached a predetermined number, extracts a plurality of characters that are recommended to be the battle characters from among the plurality of characters possessed by the player based on a parameter of each of the plurality of characters possessed by the player, determines whether or not the player can clear the stage when the extracted characters are set to be the battle characters based on a parameter of the extracted characters and a parameter of the enemy character that appears in the stage, and presents information that corresponds to a result of the determination to the player.

According to a second aspect of the invention, there is provided a game system including:

a character setting section that sets a plurality of characters selected by a player from among a plurality of characters possessed by the player to be battle characters;

a game processing section that executes a battle between the plurality of characters that have been set to be the battle characters and an enemy character that appears in a stage selected by the player, and determines whether or not the player has cleared the stage based on battle results; and an information presentation section that, when a number of times that the player failed to clear the stage has reached a predetermined number, extracts a plurality of characters that are recommended to be the battle characters from among the plurality of characters possessed by the player based on a parameter of each of the plurality of characters possessed by the player, determines whether or not the player can clear the stage when the extracted characters are set to be the battle characters based on a parameter of the extracted characters and a parameter of the enemy character that appears in the stage, and presents information that corresponds to a result of the determination to the player.

DETAILED DESCRIPTION OF THE EMBODIMENT (1) According to one embodiment of the invention, there is provided a non-transitory computer-readable information storage medium storing a program that causes a computer to function as:

a character setting section that sets a plurality of characters selected by a player from among a plurality of characters possessed by the player to be battle characters;

a game processing section that executes a battle between the plurality of characters that have been set to be the battle characters and an enemy character that appears in a stage selected by the player, and determines whether or not the player has cleared the stage based on battle results; and an information presentation section that, when a number of times that the player failed to clear the stage has reached a predetermined number, extracts a plurality of characters that are recommended to be the battle characters from among the plurality of characters possessed by the player based on a parameter of each of the plurality of characters possessed by the player, determines whether or not the player can clear the stage when the extracted characters are set to be the battle characters based on a parameter of the extracted characters and a parameter of the enemy character that appears in the stage, and presents information that corresponds to a result of the determination to the player.

According to another embodiment of the invention, there is provided a game system including the above sections.

According to the above embodiments, a plurality of characters that are recommended to be the battle characters are extracted from the characters possessed by the player when the number of times that the player failed to clear the stage has reached a predetermined number, whether or not the player can clear the stage when the extracted characters are set to be the battle characters is determined based on a parameter of the extracted characters, and a parameter of the enemy character that appears in the stage, and information that corresponds to the determination result is presented to the player. This makes it possible to provide the player with information for determining the possibility that the player can clear the stage.

(2) In each of the information storage medium and the game system, the information presentation section may present information that suggests changing the characters that are set to be the battle characters to the player when the information presentation section has determined that the player can clear the stage.

This makes it possible to notify the player that the player may be able to clear the stage if the characters that are set to be the battle characters are changed.

(3) In each of the information storage medium and the game system, the information presentation section may present the information that suggests changing the characters that are set to be the battle characters to the player when the information presentation section has determined that the player can clear the stage, and the extracted characters do not coincide with the characters that have been set to be the battle characters.

This makes it possible to notify the player that the player may be able to clear the stage if the characters that are set to be the battle characters are changed.

(4) In each of the information storage medium and the game system, the information presentation section may present information that suggests that the player cannot clear the stage to the player when the information presentation section has determined that the player cannot clear the stage.

This makes it possible to notify the player that the player cannot clear the stage even if the characters that are set to be the battle characters are changed.

Exemplary embodiments of the invention are described below. Note that the following exemplary embodiments do not unduly limit the scope of the invention as stated in the claims. Note also that all of the elements described below in connection with the following exemplary embodiments should not necessarily be taken as essential elements of the invention.

1. Configuration

Figure 1:
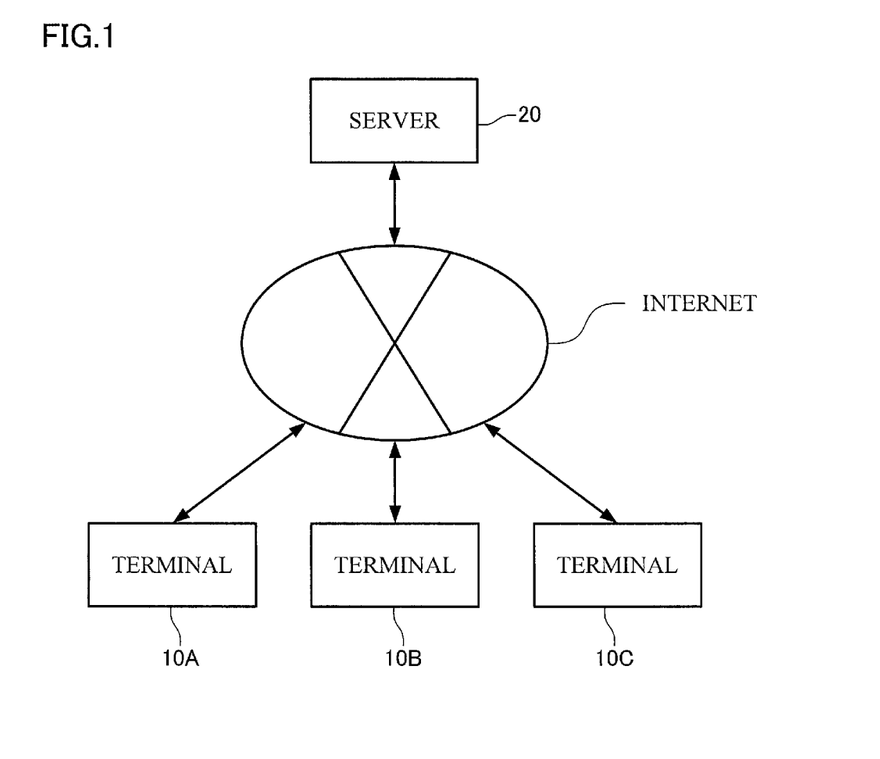
FIG. 1 illustrates a game system according to one embodiment of the invention.

FIG. 1 illustrates a network system (game system) according to one embodiment of the invention. The network system includes a plurality of terminals 10 and a server 20 (server system). As illustrated in FIG. 1, the network system is configured so that the server 20 that provides a service and the terminals 10 can be connected to a network.

The server 20 is an information processing device that provides a service that allows a plurality of users (players) to communicate. In this embodiment, the server 20 provides a community-type service that is referred to as "social networking service (SNS)". Specifically, the server 20 transmits user information (e.g., user name, diary, notice information, and game field state) to a user who has logged in, as well as another user who maintains a friendship with the user who has logged in, so that these users can communicate. The server 20 may provide the service to only users who have registered themselves as a member. The server 20 may be implemented by a single server, or may be implemented by a plurality of servers (e.g., authentication server, game processing server, communication server, accounting server, and database server).

The server 20 in this embodiment provides an online game service (social game) in response to a request from the terminal 10. The terminal 10 executes a game program, and the server 20 manages account information about each player, information about the results of the game executed by the terminal 10, game elements (e.g., character and item) that can be used in the game, and in-game money that can be used in the game, information about each stage of the game, and the like.

The terminal 10 is an information processing device such as a portable terminal (e.g., smartphone, mobile phone, or portable game machine), a personal computer (PC), a game device, or an image generation device, and can connect to the server 20 through a network (e.g., Internet (WAN) and LAN). Note that the terminal 10 and the server 20 may be connected through a cable communication channel, or may be connected through a wireless communication channel.

Figure 2:
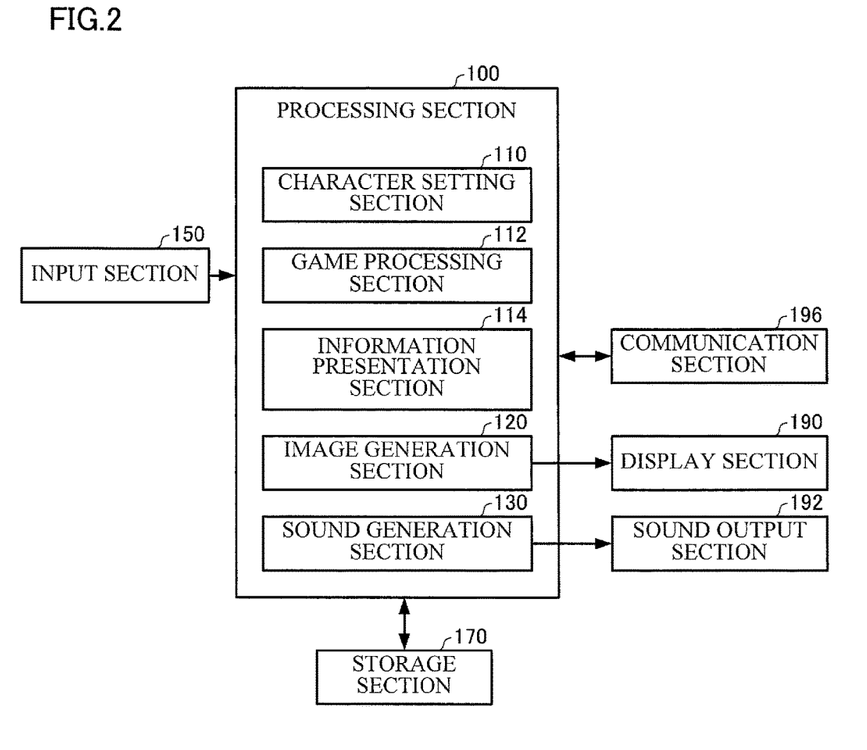
FIG. 2 is a functional block diagram illustrating an example of a terminal according to one embodiment of the invention.

FIG. 2 illustrates an example of a functional block diagram of a game device (terminal 10) in this embodiment. Note that the game device may have a configuration in which some of the elements (sections) illustrated in FIG. 2 are omitted.

An input section 150 is a device that detects information (input information) input by the player, and outputs the information (operation input) input by the player to a processing section 100. The function of the input section 150 may be implemented by an input device such as a touch panel, a touch pad, a mouse, a direction key, a button, or a keyboard.

A storage section 170 stores a program that causes a computer to function as each section of the processing section 100, and various types of data, and serves as a work area for the processing section 100. The function of the storage section 170 may be implemented by a hard disk, a RAM, or the like. The storage section 170 also stores information (e.g., type, parameter, attribute, and level) about a character that is possessed by the player (that can be used by the player), setting information about a character that has been set to be a battle character, information about an item that is possessed by the player, information (e.g., type, parameter, attribute, and level) about an enemy character, information about each stage of the game, information about an enemy character that appears in each stage, and the like.

A display section 190 outputs a game image generated by the processing section 100. The function of the display section 190 may be implemented by a display (e.g., touch panel, LCD, or CRT).

The sound output section 192 outputs the sound generated by the processing section 100. The function of the sound output section 192 may be implemented by a speaker, a headphone, or the like.

A communication section 196 performs various types of control processing for communicating with the server 20. The function of the communication section 196 may be implemented by hardware such as a processor or a communication ASIC, a program, or the like.

Note that a program (that causes a computer to function as each section of the processing section 100) and data that are stored in an information storage medium or a storage section included in the server 20 may be received through a network, and stored in the storage section 170. A case where the terminal is operated based on the program and data received from the server is also intended to be included within the scope of the invention.

The processing section 100 (processor) performs game processing, image generation processing, sound generation processing, and the like based on the information (operation input) input from the input section 150, a program, data received through the communication section 196, and the like. The function of the processing section 100 may be implemented by hardware such as a processor (e.g., CPU or DSP) or an ASIC (e.g., gate array), or a program.

The processing section 100 includes a character setting section 110, a game processing section 112, an information presentation section 114, an image generation section 120, and a sound generation section 130.

The character setting section 110 sets a plurality of characters (among a plurality of characters possessed by the player) that have been selected (by the player) based on an operation input from the input section 150 to be battle characters.

The game processing section 112 performs game processing that executes a battle between the plurality of characters that have been set to be the battle characters and an enemy character that appears in a stage selected by the player based on an operation input from the input section 150, and determines whether or not the player has cleared the stage based on the battle results.

The information presentation section 114 performs processing that extracts a plurality of characters that are recommended to be the battle characters from the plurality of characters possessed by the player based on a parameter (and/or an attribute) of each of the plurality of characters possessed by the player when the number of times that the player failed to clear the stage (i.e., the number of times that the player successively failed to clear the stage, or the number of times that the player failed to clear the stage within a predetermined period) has reached a predetermined number (1 or more), determines whether or not the player can clear the stage when the plurality of characters that have been extracted are set to be the battle characters based on a parameter of each of the plurality of characters that have been extracted, and a parameter of the enemy character that appears in the stage, and presents information that corresponds to the determination result to the player. When the information presentation section 114 presents the information that corresponds to the determination result to the player, the information presentation section 114 may output an image that represents the information to the display section 190, or output a sound that represents the information to the sound output section 192.

The information presentation section 114 may extract the plurality of characters based on a parameter (and/or an attribute) of each of the plurality of characters possessed by the player, and a parameter (and/or an attribute) of the enemy character that appears in the stage. The information presentation section 114 may compare a parameter of each of the plurality of characters that have been extracted with a parameter of the enemy character that appears in the stage to determine whether or not the player can clear the stage when the plurality of characters that have been extracted are set to be the battle characters.

The information presentation section 114 may present information that suggests changing the characters that are set to be the battle characters to the player when the information presentation section 114 has determined that the player can clear the stage, and the plurality of characters that have been extracted do not coincide with the plurality of characters that have been set to be the battle characters. The information presentation section 114 may present information that suggests that the player cannot clear the stage (e.g., information that suggests that the player cannot clear the stage even if the characters that are set to be the battle characters are changed) to the player when the information presentation section 114 has determined that the player cannot clear the stage.

The image generation section 120 performs drawing processing based on the results of various types of processing performed by the processing section 100 to generate a game image (i.e., a game image that includes a player character, an enemy character, information that corresponds to the determination result, and the like), and outputs the generated game image to the display section 190. The image generation section 120 may generate an image (i.e., three-dimensional image) viewed from a virtual camera (given viewpoint) within an object space (game space).

The sound generation section 130 performs sound generation processing based on the results of various types of processing performed by the processing section 100 to generate a game sound (e.g., background music (BGM), effect sound, or voice), and outputs the generated game sound to the sound output section 192.

The processing section 100 transmits game start information to the server 20 when the game has started, and transmits game result information (about the game results and various game parameters) to the server 20 when the game has ended. The server 20 updates various types of data that are linked to each player based on the game result information transmitted from the game device (terminal 10). The processing section 100 may transmit battle character setting information to the server 20 when the battle character setting information has been changed.

The game system in this embodiment may be implemented by a server system (game system). The server system may include a single server, or may include a plurality of servers (e.g., authentication server, game processing server, communication server, accounting server, and database server). In this case, the server system performs processing performed by the character setting section 110, the game processing section 112, and the information presentation section 114 based on an operation input (i.e., data input to an input section of a terminal) transmitted from one terminal or a plurality of terminals (e.g., smartphone, mobile phone, or portable game machine) connected to the server system through a network to generate image generation data for generating an image, and transmits the generated image generation data to each terminal. Note that the term "image generation data" used herein refers to data for displaying an image generated by the method in this embodiment on each terminal. The image generation data may be image data, or may be data (e.g., object data and game processing result data) that is used when each terminal generates an image. The game system may be configured so that the server and the terminal execute processing performed by each section (character setting section 110, game processing section 112, information presentation section 114, and image generation section 120) of the processing section 100 in a distributed manner. For example, the game system may be configured so that the terminal executes processing performed by the character setting section 110 and processing performed by the game processing section 112, and the server executes processing performed by the information presentation section 114.

2. Method

A method according to one embodiment of the invention is described below with reference to the drawings.

The game system in this embodiment is configured to implement a battle game in which the player character battles with the enemy character.

FIGS. 3 and 6 to 8 illustrate examples of a game screen (game image) generated by the game system. A game screen GI is displayed on the display section 190 (touch panel) of the terminal 10. The player can perform an operation input by touching the touch panel with a fingertip, a touch pen, or the like (i.e., performing a touch operation).

Figure 3:
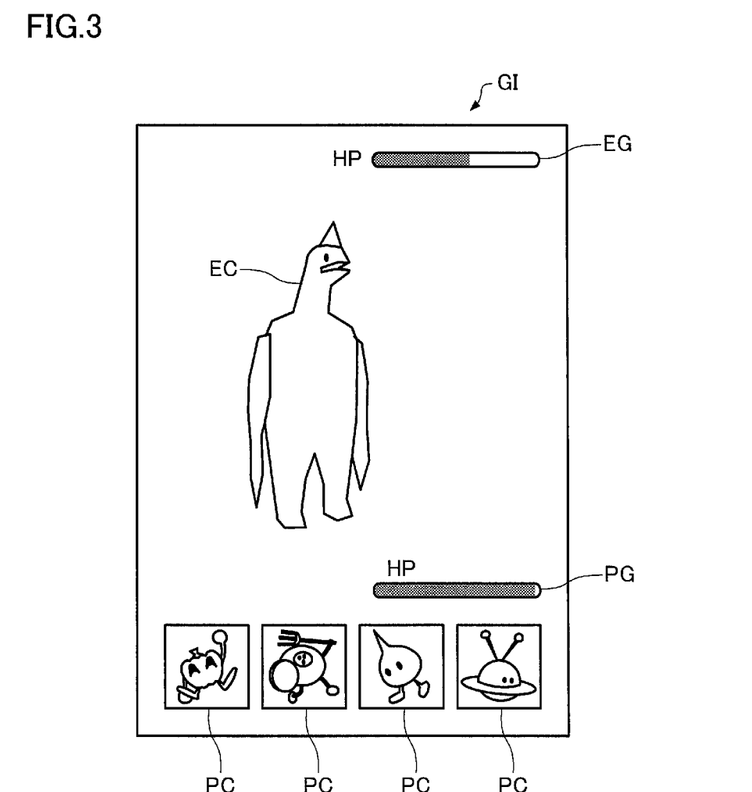
FIG. 3 illustrates an example of a game screen that is generated by a game system according to one embodiment of the invention.

FIG. 3 illustrates the game screen GI that is displayed when the player character battles with the enemy character.

As illustrated in FIG. 3, a player character PC and an enemy character EC are displayed within the game screen GI. In the example illustrated in FIG. 3, four player characters PC that form a deck (party) are displayed within the game screen GI. The four player characters PC are characters (among a plurality of characters possessed by the player) that have been selected by the player, and set to be battle characters. The player can arbitrarily select four characters that form a deck from a plurality of characters possessed by the player when battling with the enemy character EC. A gauge PG that represents the total hit points (strength value) of the four player characters PC, and a gauge EG that represents the hit points of the enemy character EC are displayed within the game screen GI.

When the player has performed an operation input that selects one of the four player characters PC within the game screen GI illustrated in FIG. 3, the selected player character PC attacks the enemy character EC, and the hit points of the enemy character EC represented by the gauge EG are updated. The hit points of the enemy character EC decrease corresponding to the attack capability of the player character PC that has attacked the enemy character EC.

The enemy character EC attacks the player character PC at a given timing (e.g., each time a predetermined number of turns have elapsed, or each time the number of turns specific to the enemy character EC have elapsed), and the total hit points of the player characters PC represented by the gauge PG are updated. The total hit points of the player characters PC decrease corresponding to the attack capability of the enemy character EC.

When the player has performed an operation input that causes the selected player character PC to perform a recovery motion, the selected player character PC may make the recovery motion, and the total hit points of the player characters PC represented by the gauge PG may be updated. In this case, the total hit points of the player characters PC increase corresponding to the recovery capability of the player character PC that has made the recovery motion (i.e., the selected player character PC).

The battle between the player character PC and the enemy character EC continues until the total hit points of the player characters PC or the hit points of the enemy character EC reach a predetermined value (e.g., 0). It is determined that the enemy character EC has been defeated when the hit points of the enemy character EC have become equal to or less than the predetermined value, and it is determined that the player has lost the battle when the total hit points of the player characters PC have become equal to or less than the predetermined value.

A plurality of enemy characters EC appear in each stage of the game. When the player has defeated the first enemy character EC (subordinate character) that has appeared in the current stage, the second enemy character EC (subordinate character) appears. When the player has defeated the second enemy character EC, the third enemy character EC (subordinate character) appears. When the player has defeated the final enemy character EC (boss character) that has appeared in the current stage, it is determined that the player has cleared the current stage (i.e., the player has won). When the player has cleared the current stage, a reward that corresponds to the current stage (i.e., a reward that corresponds to a plurality of enemy characters EC that have appeared in the current stage) is given to the player. For example, a new character, a new item, points (e.g., experience value or in-game money), or the like is/are given to the player as the reward. When points (e.g., experience value) have been given to the player as the reward, parameter (e.g., attack capability), level, or the like of each player character PC is updated (increased).

The game in this embodiment is designed so that a new character or a new item (e.g., equipment or expendable) is given to the player when the player has consumed predetermined points among points (including points obtained free of charge and points obtained via purchase) obtained in the game (known as "gacha").

The game in this embodiment is designed so that the player can strengthen the desired character possessed by the player using a character (or item) that has been given to the player as a reward, or a character (or item) that has been obtained by consuming predetermined points. For example, the player can select a synthesis base character and one or more synthesis material characters, and synthesize the selected characters to strengthen the synthesis base character (or generate a new character developed from the synthesis base character). An increase in parameter or level when the character is strengthened changes corresponding to the parameter, the level, or the attribute of the character selected as the synthesis material. Note that a character for which the level has reached the maximum value cannot be further strengthened. The maximum value of the level differs corresponding to the type of character. The character selected as the synthesis material is deleted from the list of the characters possessed by the player.

The game in this embodiment is designed so that a plurality of stages that differ in level (difficulty level) are provided, and a new stage (i.e., a stage at a higher difficulty level) appears as the story advances. Specifically, when the player has cleared the first stage, the player can select (play) the next stage (second stage). When the player has cleared the second stage, the player can select the third stage. The enemy characters EC that appear in the second stage are generally stronger (i.e., higher in parameter value (e.g., attack capability) and level) than the enemy characters EC that appear in the first stage, and the enemy characters EC that appear in the third stage are generally stronger than the enemy characters EC that appear in the second stage. Specifically, when the player has cleared the current stage, enemy characters EC that have a higher attack capability and a higher level appear in the next stage.

The game in this embodiment is designed so that, when the number of times that the player failed to clear the current stage (identical stage) has reached a predetermined number (e.g., three), it is determined whether the player can clear the current stage if the characters that form the deck (i.e., the characters that are set to be the battle characters) are changed, or cannot clear the current stage even if the characters that form the deck are changed, and information that corresponds to the determination result is presented to the player.

Figure 4:
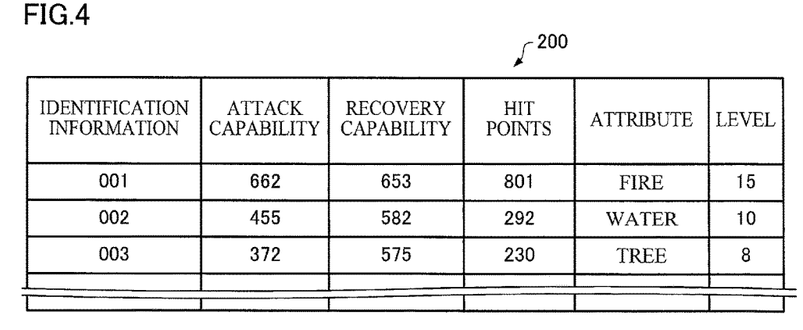
FIG. 4 is a table illustrating an example of table information that includes parameters and the like of characters possessed by a player.
Figure 5:
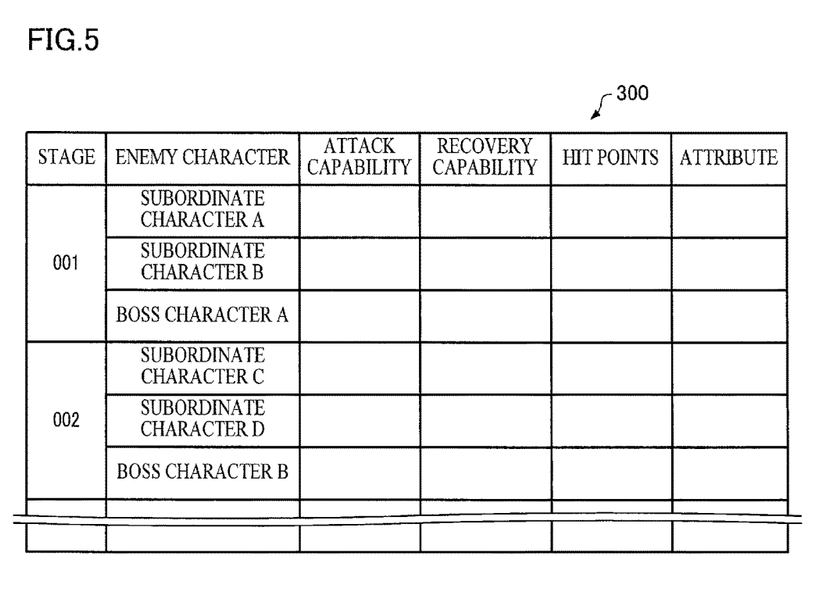
FIG. 5 is a table illustrating an example of table information that includes parameters and the like of enemy characters that appear in each stage.

Specifically, a plurality of characters that are recommended to be the battle characters (i.e., recommended to be included in the deck) are extracted from the characters possessed by the player. FIG. 4 illustrates an example of table information that includes parameters and the like of the characters possessed by the player. As illustrated in FIG. 4, table information 200 includes identification information about each character possessed by the player, and information about the attack capability, the recovery capability, the hit points, the attribute (e.g., "fire", "water", or "tree"), the level, and the like of each character possessed by the player. Note that the attack capability, the recovery capability, and the hit points are parameters. FIG. 5 illustrates an example of table information that includes parameters and the like of the enemy characters. As illustrated in FIG. 5, table information 300 includes information about parameters (attack capability, recovery capability, and hit points), the attribute, and the like of each of a plurality of enemy characters (subordinate character and boss character) that appear in each stage. For example, the table information 300 illustrated in FIG. 5 represents that a subordinate character A, a subordinate character B, and a boss character A appear in a stage "001" as the enemy characters.

In this embodiment, four characters that are recommended to form a deck are extracted referring to the table information 200 illustrated in FIG. 4. For example, the total value of the parameters (attack capability, recovery capability, and hit points) is calculated corresponding to each character, and four characters are extracted in descending order of the total value. When importance is attached to the attack capability, four characters may be extracted in descending order of the attack capability. When importance is attached to the recovery capability, four characters may be extracted in descending order of the recovery capability. When importance is attached to the balance between the attack capability and the recovery capability, two characters may be extracted in descending order of the attack capability, and two characters may be extracted in descending order of the recovery capability. Alternatively, four characters may be extracted referring to the table information 300 illustrated in FIG. 5 taking account of the attribute of the enemy characters that appear in the stage that could not be cleared by the player a predetermined number of times. For example, when the attributes have a superior-inferior relationship (e.g., when the attribute "water" is superior to the attribute "fire", the attribute "tree" is superior to the attribute "water", and the attribute "fire" is superior to the attribute "tree"), a character that has an attribute superior to the attribute of the enemy character (e.g., boss character) that appears in the stage that could not be cleared by the player a predetermined number of times may be preferentially extracted.

Next, whether or not the player can clear the stage when the deck is formed by the extracted four characters (i.e., when the recommended deck is used) is determined based on parameters of each of the extracted four characters and parameters of each of the enemy characters that appear in the stage referring to the table information 200 and the table information 300. For example, the total value $S_p$ of the parameters (attack capability, recovery capability, and hit points) of the extracted four characters is compared with the total value $S_e$ of the parameters (attack capability, recovery capability, and hit points) of the enemy characters that appear in the stage. It is determined that the player cannot clear the stage when the total value $S_p$ is smaller than the total value $S_e$, and the difference between the total value $S_p$ and the total value $S_e$ is equal to or larger than a predetermined value. It is determined that the player can clear the stage when the total value $S_p$ is larger than the total value $S_e$, or the difference between the total value $S_p$ and the total value $S_e$ is equal to or smaller than the predetermined value. Note that adjustment processing may be performed so that the total value $S_p$ increases when the attribute of the extracted character is superior to the attribute of the enemy character (e.g., boss character) that appears in the stage, and decreases when the attribute of the extracted character is inferior to the attribute of the enemy character. Alternatively, calculation processing may be performed according to a predetermined algorithm based on parameters of the extracted four characters and parameters of the enemy characters that appear in the stage. It may be determined that the player can clear the stage when the calculated value satisfies a predetermined condition, and the player cannot clear the stage when the calculated value does not satisfy the predetermined condition.

Figure 6:
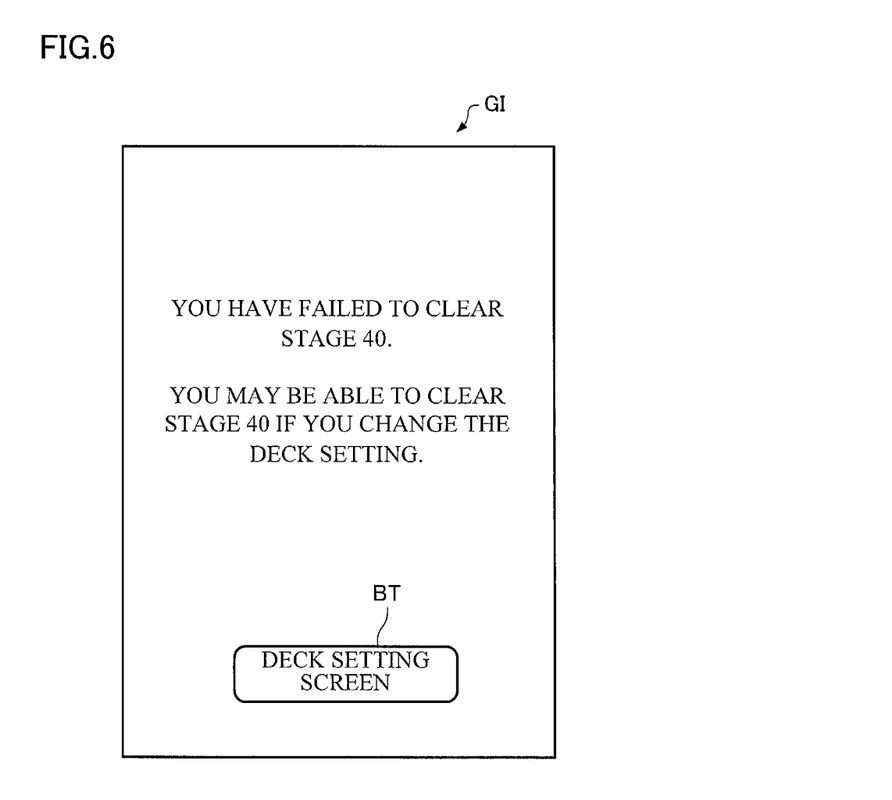
FIG. 6 illustrates an example of a game screen that is generated by a game system according to one embodiment of the invention.
Figure 7:
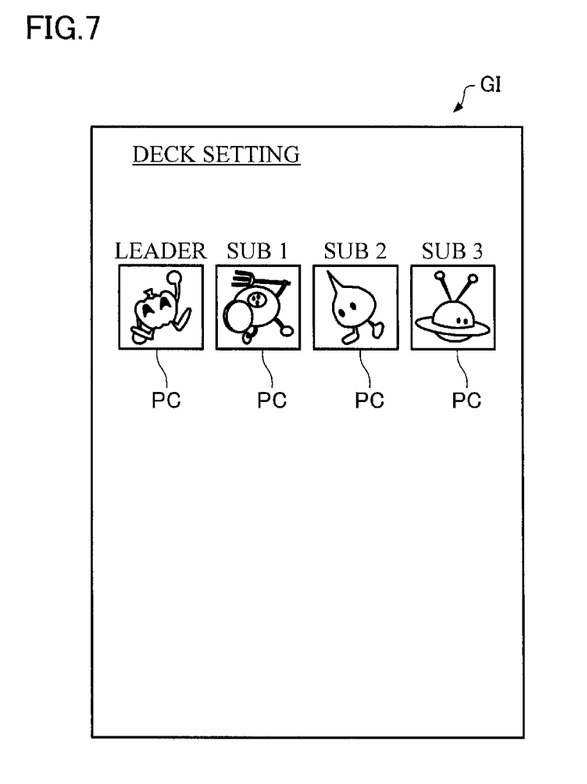
FIG. 7 illustrates an example of a game screen that is generated by a game system according to one embodiment of the invention.

When it has been determined that the player can clear the stage when the deck is formed by the extracted four characters, information that suggests changing the characters that form the deck is displayed within the game screen GI (see FIG. 6). FIG. 6 illustrates an example of information that is displayed when the number of times that the player failed to clear the stage 40 has reached a predetermined number. The information illustrated in FIG. 6 suggests that the player may be able to clear the stage 40 if the characters that form the deck are changed. When the player has performed an operation input that selects a button BT displayed within the game screen GI illustrated in FIG. 6, the game screen GI illustrated in FIG. 7 that allows the player to change the configuration of the deck is displayed. Four player characters PC ("LEADER", "SUB 1", "SUB 2", and "SUB 3") that form the deck are displayed within the game screen GI illustrated in FIG. 7. When the player has performed an operation input that selects the change target player character PC displayed within the game screen GI illustrated in FIG. 7, a screen that shows a list of the characters possessed by the player is displayed. When the player has performed an operation input that selects the desired character displayed within the screen that shows a list of the characters possessed by the player, the selected character is set to be the battle character. For example, the player selects the player character "LEADER", and selects another character from the list of the characters possessed by the player to replace the player character "LEADER" with the other character.

Note that the game screen GI illustrated in FIG. 6 is not displayed when it has been determined that the player can clear the stage, and the extracted four characters coincide with the four player characters PC that form the deck, since it is unnecessary to change the deck (i.e., the player can clear the stage even if the deck is not changed). The game screen GI illustrated in FIG. 6 may not be displayed when the extracted four characters do not coincide with the four player characters PC that form the deck, but the player can substantially clear the stage even if the deck is not changed (e.g., when the total parameter value of the extracted four characters is almost equal to the total parameter value of the four player character PC that form the deck).

Figure 8:
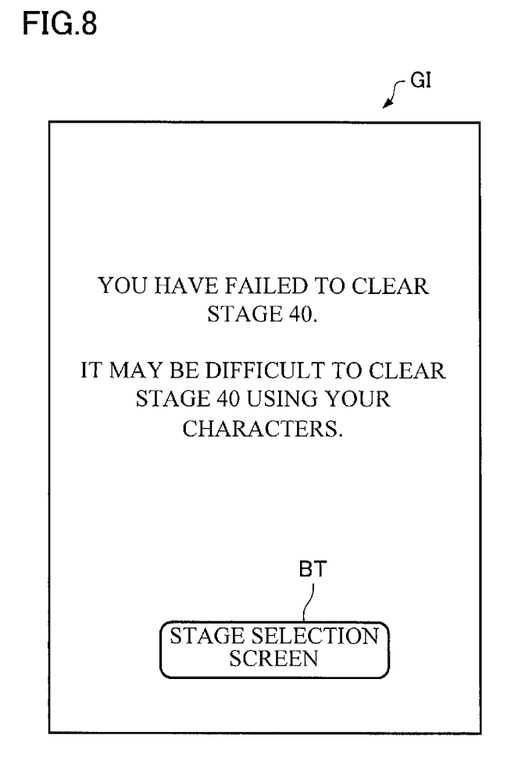
FIG. 8 illustrates an example of a game screen that is generated by a game system according to one embodiment of the invention.

When it has been determined that the player cannot clear the stage when the deck is formed by the extracted four characters, information that suggests the player cannot clear the stage is displayed within the game screen GI (see FIG. 8). FIG. 8 illustrates an example of information that is displayed when the number of times that the player failed to clear the stage 40 has reached a predetermined number. The information illustrated in FIG. 8 suggests that the player cannot clear the stage 40 if the characters that form the deck are changed. When the player has performed an operation that selects the button BT displayed within the game screen GI illustrated in FIG. 8, a stage selection game screen is displayed. The stage selection game screen may be displayed so that the player cannot select (play) the stage (e.g., the stage 40 in the example illustrated in FIG. 8) that cannot be cleared by the player. For example, the stage selection game screen may be displayed so that the stage that cannot be cleared by the player is not displayed. Note that information that suggests strengthening the characters possessed by the player (e.g., by synthesis of characters) may be presented to the player when it has been determined that the player cannot clear the stage.

As stated above, it is possible to provide the player with useful information for determining the possibility that the player can clear the stage by extracting a plurality of characters that are recommended to be included in the deck from the characters possessed by the player when the number of times that the player failed to clear the stage has reached a predetermined number, determining whether or not the player can clear the stage when the deck is formed by the plurality of characters that have been extracted, presenting information that suggests changing the characters that form the deck to the player when it has been determined that the player can clear the stage, and presenting information that suggests that the player cannot clear the stage to the player when it has been determined that the player cannot clear the stage. Specifically, the player who has failed to clear the stage can easily determine whether the player can (may be able to) clear the stage if the deck is formed by selecting appropriate characters, or the player cannot clear the stage even if the deck is formed by selecting appropriate characters.

3. Processing

Figure 9:
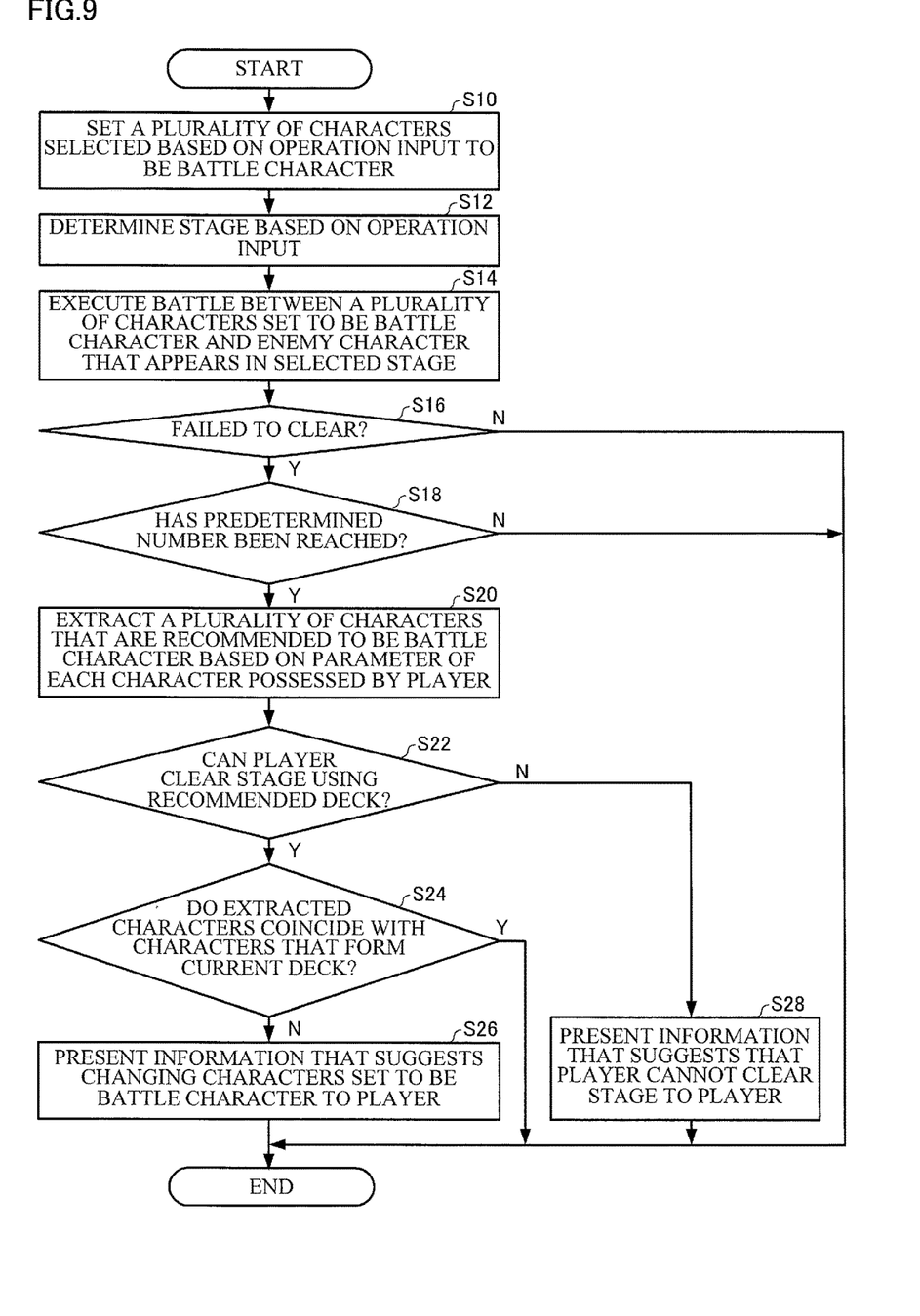
FIG. 9 is a flowchart illustrating a flow of processing according to one embodiment of the invention.

An example of processing performed by the game system according to one embodiment of the invention is described below with reference to FIG. 9 (flowchart).

The character setting section 110 sets a plurality of characters that have been selected based on an operation input to be the battle characters (i.e., the player character PC that forms the deck) (step S10). The game processing section 112 determines the stage that has been selected based on an operation input to be the battle stage (step S12), executes a battle between the plurality of characters that have been set to be the battle characters and the enemy character that appears in the battle stage, and updates the hit points of each enemy character and the total hit points of the player characters PC (step S14).

The game processing section 112 determines whether or not the player has cleared the stage (i.e., the stage determined in the step S12) based on the battle results (step S16). When the game processing section 112 has determined that the total hit points of the player characters PC have become equal to or less than a predetermined value, and the player has failed to clear the stage (Y in step S16), the game processing section 112 increments a failure count that is stored and linked to the stage by 1, and determines whether or not the failure count that is linked to the stage has reached a predetermined number (step S18).

When the failure count that is linked to the stage has reached the predetermined number (Y in step S18), the information presentation section 114 refers to the table information 200, and extracts a plurality of characters that are recommended to be the battle characters from the characters possessed by the player based on parameters of each character possessed by the player (step S20).

The information presentation section 114 refers to the table information 200 and the table information 300, and determines whether or not the player can clear the stage when the extracted characters are set to be the battle characters (i.e., when the recommended deck is used) based on the parameters of each of the characters extracted in the step S20 and the parameters of the enemy character that appears in the stage (i.e., the stage determined in the step S12) that could not be cleared by the player (step S22).

When the information presentation section 114 has determined that the player can clear the stage (Y in step S22), the information presentation section 114 determines whether or not the characters that have been extracted in the step S20 coincide with the characters that have been set to be the battle characters in the step S10 (step S24). When the information presentation section 114 has determined that the characters that have been extracted in the step S20 do not coincide with the characters that have been set to be the battle characters in the step S10 (N in step S24), the information presentation section 114 presents information that suggests changing the characters that are set to be the battle characters to the player (step S26).

When the information presentation section 114 has determined that the player cannot clear the stage (N in step S22), the information presentation section 114 presents information that suggests that the player cannot clear the stage to the player (step S28).

4. Modification

The invention is not limited to the above embodiments. Various modifications and variations may be made of the above embodiments. Any term cited with a different term having a broader meaning or the same meaning at least once in the specification and the drawings may be replaced by the different term in any place in the specification and the drawings.

Although an example in which whether or not the player can clear the stage using the recommended deck is determined when the number of times that the player failed to clear the stage has reached a predetermined number has been described above, the invention is not limited thereto. For example, a plurality of characters that are recommended to be the battle characters may be extracted when the player has cleared the stage after the total hit points of the player character PC have become equal to or less than a predetermined value during a battle, and the hit points have been recovered by applying a predetermined item (recovery item) that recovers (increases) the hit points a predetermined number of times (one or more times), whether or not the player can clear the stage when the extracted characters are set to be the battle characters may be determined, and information that corresponds to the determination result may be presented to the player.

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

What is claimed is:

1. A non-transitory computer-readable information storage medium storing a program that causes a computer to function as:
a character setting section that sets a plurality of characters selected by a player from among a plurality of characters possessed by the player to be battle characters;
a game processing section that executes a battle between the plurality of characters that have been set to be the battle characters and an enemy character that appears in a stage selected by the player, and determines whether or not the player has cleared the stage based on battle results; and
an information presentation section that, when a number of times that the player failed to clear the stage has reached a predetermined number:
extracts a plurality of characters that are recommended to be the battle characters from among the plurality of characters possessed by the player based on a parameter of each of the plurality of characters possessed by the player,
determines whether or not the player can clear the stage when the extracted characters are set to be the battle characters by comparing a parameter of the extracted characters with a parameter of the enemy character that appears in the stage that could not be cleared by the player the predetermined number of times, and
presents information that corresponds to a result of the determination to the player.

2. The information storage medium as defined in claim 1, wherein the information presentation section presents information that suggests changing the characters that are set to be the battle characters to the player when the information presentation section has determined that the player can clear the stage.

3. The information storage medium as defined in claim 2, wherein the information presentation section presents the information that suggests changing the characters that are set to be the battle characters to the player when the information presentation section has determined that the player can clear the stage, and the extracted characters do not coincide with the characters that have been set to be the battle characters.

4. The information storage medium as defined in claim 3, wherein the information presentation section presents information that suggests that the player cannot clear the stage to the player when the information presentation section has determined that the player cannot clear the stage.

5. The information storage medium as defined in claim 2, wherein the information presentation section presents information that suggests that the player cannot clear the stage to the player when the information presentation section has determined that the player cannot clear the stage.

6. The information storage medium as defined in claim 1, wherein
the information presentation section presents information that suggests changing the characters that are set to be the battle characters to the player, when the information presentation section has determined that the player can clear the stage,
the information presentation section receives input from the player that changes the characters which are set to be the battle characters, as changed-battle-characters, and
the game processing section executes the battle between the changed-battle-characters and the enemy character in the stage, which is a same stage with a same enemy character which the player failed to clear the predetermined number of times.

7. The information storage medium as defined in claim 1, wherein
the battle is part of a multi-stage battle game with successive stages of increasing difficulty level, in which a player is allowed to play a next stage with a higher difficulty level than a current stage only after the player clears the current stage by defeating the enemy character.

8. A game system comprising:
a character setting section that sets a plurality of characters selected by a player from among a plurality of characters possessed by the player to be battle characters;
a game processing section that executes a battle between the plurality of characters that have been set to be the battle characters and an enemy character that appears in a stage selected by the player, and determines whether or not the player has cleared the stage based on battle results; and
an information presentation section that, when a number of times that the player failed to clear the stage has reached a predetermined number:
extracts a plurality of characters that are recommended to be the battle characters from among the plurality of characters possessed by the player based on a parameter of each of the plurality of characters possessed by the player,
determines whether or not the player can clear the stage when the extracted characters are set to be the battle characters by comparing a parameter of the extracted characters and a parameter of the enemy character that appears in the stage that could not be cleared by the player the predetermined number of times, and
presents information that corresponds to a result of the determination to the player.

9. The game system as defined in claim 8,
wherein the information presentation section presents information that suggests changing the characters that are set to be the battle characters to the player when the information presentation section has determined that the player can clear the stage.

10. The game system as defined in claim 9,
wherein the information presentation section presents the information that suggests changing the characters that are set to be the battle characters to the player when the information presentation section has determined that the player can clear the stage, and the extracted characters do not coincide with the characters that have been set to be the battle characters.

11. The game system as defined in claim 10,
wherein the information presentation section presents information that suggests that the player cannot clear the stage to the player when the information presentation section has determined that the player cannot clear the stage.

12. The game system as defined in claim 9,
wherein the information presentation section presents information that suggests that the player cannot clear the stage to the player when the information presentation section has determined that the player cannot clear the stage.

13. The game system as defined in claim 8, wherein the information presentation section presents information that suggests changing the characters that are set to be the battle characters to the player, when the information presentation section has determined that the player can clear the stage, the information presentation section receives input from the player that changes the characters which are set to be the battle characters, as changed-battle-characters, and the game processing section executes the battle between the changed-battle-characters and the enemy character in the stage, which is a same stage and a same enemy character which the player failed to clear the predetermined number of times.

14. The game system as defined in claim 8, wherein the battle is part of a multi-stage battle game with successive stages of increasing difficulty level, in which a player is allowed to play a next stage with a higher difficulty level than a current stage only after the player clears the current stage by defeating the enemy character.

* * * * *